Feb. 19, 1963 P. W. MORGAN 3,078,242
COMPOSITION COMPRISING A SOLUTION OF AN ORGANIC COMPOUND
CONTAINING TWO REACTIVE GROUPS AND A POLYMER IN
THE FORM OF PARTICLES BELOW ABOUT 15 MICRONS
Filed Sept. 30, 1957
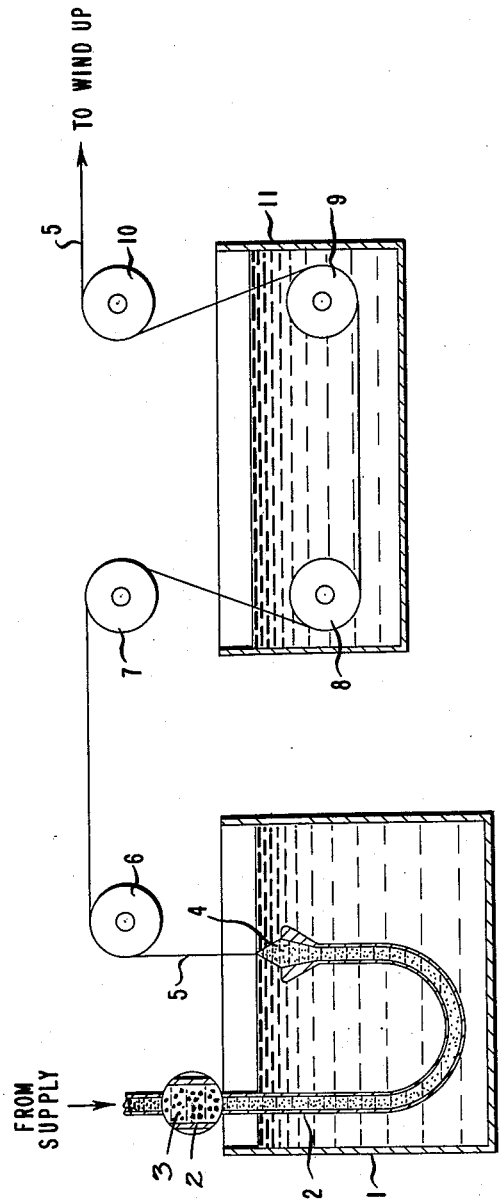
INVENTOR
PAUL WINTHROP MORGAN
BY *Carl A. Hechmer*
ATTORNEY United States Patent Office 3,078,242
Patented Feb. 19, 1963

3,078,242
COMPOSITION COMPRISING A SOLUTION OF AN ORGANIC COMPOUND CONTAINING TWO REACTIVE GROUPS AND A POLYMER IN THE FORM OF PARTICLES BELOW ABOUT 15 MICRONS
Paul Winthrop Morgan, West Chester, Pa., assignor to E. I. du Pont de Nemours and Company, Wilmington, Del., a corporation of Delaware
Filed Sept. 30, 1957, Ser. No. 686,906
14 Claims. (Cl. 260—29.6)

This invention relates to a novel and useful shaped structure and a process for its production. More specifically it is concerned with a novel and useful shaped structure produced by an interfacial-forming technique.

By the expression "interfacial-forming" technique is meant a process for the polymerization between fast-reacting organic condensation polymer-forming intermediates at an interface of controlled shape between two liquid phases, each of which contains at least one complementary intermediate, to form a shaped condensation polymer and thereafter withdrawing the polymer from the interface. Such a forming operation is described in United States Patent 2,708,617 while filamentary products formed by this process are described in United States Patent 2,798,283.

OBJECTS

It is an object of the present invention to provide a novel and useful shaped structure.

Another object is to produce a novel and useful shaped structure comprising an interfacially-formed structure in intimate contact with a continuous "preformed" polymeric component.

A further object is to provide a novel dispersion useful in forming a novel and shaped structure in an interfacial-forming technique.

These and other objects will become apparent in the course of the following specification and claims.

STATEMENT OF INVENTION

In accordance with the present invention, a novel product is produced by a process which comprises shaping a structure, such as a film or a filament, by an interfacial-forming technique wherein at least one phase of the interfacial-forming system includes a dispersed "preformed" polymeric component. By the term "preformed" polymer as employed herein is intended a synthetic material produced by a polymerization prior to the use of the said "preformed" polymer as a dispersion in the interfacial-forming technique. In the process of the present invention, the dispersed preformed polymeric component is present in at least one phase of the interfacial-forming system (i.e., as a dispersion in the solution of at least one complementary reactant). After depositing upon or within the interfacially-formed structure the preformed component may be made continuous by coalescing the particles by heating, treatment with solvent or the like. The final product may be the composite of the interfacially-formed polymer and the polymeric component (as where the preformed component is present as a coating on the outside or a filler on the inside, or both, of the interfacially-formed condensation polymer) or the condensation polymer may be removed by being dissolved, hydrolyzed, decomposed, oxidized or the like, leaving a final structure composed entirely of the preformed polymer. The invention is particularly useful in forming structures from "intractable" preformed polymers. The term "intractable" as used herein is intended to include any high molecular weight coalescible polymeric material which decomposes before or upon melting or has too high melt viscosity for conventional extrusion, or has too poor solubility for dry spinning.

FIGURE

The invention will be more readily understood by reference to the illustration. The FIGURE is a schematic representation of an apparatus suitable for interfacially-forming a filament. In the system, a suitable vessel or tank 1 contains a solution of one complementary intermediate while the liquid comprising the other intermediate is introduced through the tube 2, which preferably is flared at its delivery end. For laboratory runs, a hypodermic needle conveniently fulfills the requirements of this element. The solution of complementary intermediate introduced through tube 2 has the preformed polymer 3 (shown in the circular blow-up of tube 2) dispersed in it. The dispersion may be metered at a constant rate from a supply chamber, not shown. The continuous phase of the dispersion may be undiluted complementary intermediate or it may be a solution of the intermediate in an inert diluent, which is immiscible with the solution in tank 1. The flared end of tube 2 constitutes a small reservoir 4 which is kept supplied with the solution of the other intermediate. At the area of contact of the bubble-shaped pool of reactant liquid in this reservoir 4 with the reactant solution in tank 1, high molecular weight polymer forms very rapidly and can be drawn away from this area in the form of a filament 5. The filament 5 may be wound up directly or it may be led over suitable rollers 6, 7, 8, 9, 10 and washed in tank 11 prior to windup as illustrated in the figure. If the flared end has an elongated shape, instead of circular, a ribbon or film of polymer can be drawn away continuously in a similar manner. Thus bristles, films, foils, tape, ribbons and the like as well as filaments can be formed by this technique.

EXAMPLES

The following examples are set forth to illustrate the invention. They are not intended to limit it in any manner.

Example I

Using the system diagrammed in the figure, an aqueous dispersion of tetrafluoroethylene polymer containing 61% solids and mixed with 5 times its weight of a 20% aqueous solution of hexamethylene diamine, is extruded through a hypodermic needle having a 10 mil diameter orifice into a bath of benzene containing 10% terephtholyl chloride. The extruded stream quickly congeals into a thread line that is firm enough to grasp and pull continuously as formed. The thread is dried in hot air and sintered by slowly pulling it with minimum tension over a plate at 360° C. Upon drawing the sintered filament two times its original length over a plate at 150° C., the product is shiny, white, opaque and moderately strong. Microscopic examination of cross section shows the thread to be composed of about equal amounts of two separate polymers, a skin of polyamide with a roughly-defined fused core of polytetrafluoroethylene.

Example II

Hexahydroterephthaloyl chloride dissolved in chlorinated biphenyl containing an average of about 48% chlorine, and containing as a dispersed solid polytrifluorochloroethylene resin of high molecular weight, the acid chloride and polymer being present in equal weights to provide a composition with a total solids content of 20%, is extruded from a 10 mil diameter orifice into a water bath containing 4% hexamethylene diamine and 10% sodium hydroxide. When the extrusion takes place within an hour of mixing the acid chloride with the dispersion, the thread promptly congeals to a lustrous tough fiber which can be continuously withdrawn at a speed of 20 yards per minute. The thread line is passed through acetone and through alcohol before being wound up. After sintering at 320° C. and drawing two times its original length, the yarn contains two continuous polymers in about equal proportions. Upon being washed in hot ethylene chlorohydrin the polyamide sheath is dissolved, leaving a continuous core of trifluorochloroethylene polymer.

*Example III*

Polyvinyl fluoride of high molecular weight and polymerized in the form of very fine particles, is dried and mixed with hexamethylene diamine and dimethylformamide in the proportions by weight of 1:1:5. With high speed stirring, this gives a fluid stable dispersion of soild polyvinyl fluoride in a solution of diamine. This mixture is extruded through a 10-mil spinneret into a benzene bath containing 5% sebacyl chloride where it congeals to a continuous filament strong enough to lift out and dry in air at about 100° C. Upon drying, the dispersed particles fuse together with a large increase in strength and an increase in luster. When drawn two times its extruded length over a plate at 125° C. a strong filament results. This yarn consists of two separate continuous polymers.

*Example IV*

Polyvinyl fluoride of high molecular weight is dispersed in dimethylformamide by passing the mixture through a Charlotte colloid mill. Sebacyl chloride is added to give a fluid, stable mix containing 20% suspended polymer and 10% diacid chloride which mix is extruded into a water bath containing 10% hexamethylene diamine and 7% sodium hydroxide. The extruded stream congeals into a thread strong enough to be continuously removed. Upon drying in warm air, it becomes lustrous and strong enough to be drawn over a plate at 125° C. The drawn product consists of a continuous core of the polyvinyl fluoride enclosed in a sheath of the polyamide.

*Example V*

A dispersion of 30 parts polytrifluorochloroethylene in a solution of 5 parts sebacyl chloride and 65 parts benzene is extruded into a bath of 10 parts hexamethylene diamine in 90 parts of water. A filament is drawn away from the spinneret by a driven roll. It is dried and sintered at 250° C. on a hotplate.

*Example VI*

A 79% aqueous solution of hexamethylene diamine is added to a 40% dispersion of fiber-forming polyacrylonitrile to form a mixture containing 10% hexamethylene diamine. It is spun into benzene containing 5% sebacyl chloride. A strong filament is obtained. When passed into a 56% aqueous calcium thiocyanate solution at 90° C. the polyacrylonitrile inner portion is coalesced without shrinkage of the polyamide skin. When sulfuric acid is used as a coalescing agent, the polyamide skin shrinks to conform to the coalesced inner portion forming drawable fibers which when drawn ten times its extruded length over a hot plate at 160° C. produces an 80 denier fiber, having a dry tenacity of 2.3 grams per denier, an elongation of 13%, a dry modulus of 41 grams per denier, 22% work recovery at 3%, and 43% tensile recovery at 5%.

Better spinning continuity results when the 10% hexamethylene diamine mix is spun into a 10% solution of sebacyl chloride in carbon tetrachloride.

This example shows a very simple method of combining physical properties of two commercial polymers. The product shows good abrasion resistance, good hand, good recovery property, and the crush resistance of polyacrylonitrile without the fibrillation tendency of polyacrylonitrile. The polyamide skin of the new product also provides the fiber structure with the dye sensitivity characteristic of a polyamide.

In a simpler embodiment of the interphase-forming technique, a film is formed in a container such as a beaker or graduate at the interface of two immiscible liquids, each containing a complementary reactant and at least one phase containing inert liquid diluent. This film may be continuously withdrawn, by lifting it at its center, to form a tube-like structure. The following examples illustrate this procedure.

*Example VII*

One cc. of a 20% aqueous solution of hexamethylene diamine is added to 5 cc. of an aqueous dispersion of polytetrafluoroethylene. To this a solution of 2 cc. sebacyl chloride in 5 cc. xylene is carefully added so as to form a separate upper phase. A coarse fiber is lifted from the interface, blotted, washed in turn with water and with 50% aqueous alcohol containing 5% hydrochloric acid. After drying, the white fiber is soft and contains free polytetrafluoroethylene powder in the center of the tube-like casing of polyhexamethylene sebacamide. It is sintered over a hotplate at 400° C. to a charred dense monofil which is non-inflammable in a gas flame. The carefully sintered fiber has a stiff surface. However its core is pliable and it is quite strong. Upon breaking, sheathed polytetrafluoroethylene flexible fibrils appear. The outside contains polytetrafluoroethylene in folds of polyhexamethylene sebacamide.

*Example VIII*

A similar experiment to Example VII with the acid chloride in carbon tetrachloride as the lower phase produced a fiber with the polytetrafluoroethylene particles on the outside and in the folds. This fiber did not have the complete flame resistance of the preceding sample. The sintered fiber shows soft fibrous ends when broken.

DISPERSED "PREFORMED" COMPONENT

As previously described, in the present invention, a preformed polymeric component is dispersed in at least one phase of the interfacial-forming liquids. Typical of intractable polymers for the shaping of which the process of the present invention is particularly adapted are polytetrafluoroethylene, polyvinylfluoride, polytrifluorochloroethylene, certain piperazine condensation polymers such as the aromatic amides, ureas and urethanes, cross-linked polymers and the like. Broadly any coalescible dispersed polymer may be used such as polyacrylonitrile, polyhexamethyleneadipamide, polyhexamethylenesebacamide, polyethyleneterephthalate or the like. Copolymers and polymer mixtures are also useful. Preferably the preformed polymers are of high molecular weight. A preformed polymer having a molecular weight in the fiber-forming range is particularly desirable when the supporting polymer of interfacial-forming origin is removed subsequent to, or simultaneously with, the step of coalescence.

INTERFACIAL-FORMING TECHNIQUE

In the interfacial-forming technique one of the intermediates is a low molecular weight organic compound having at least two similar or dissimilar reactive groups selected from the group consisting of amino and amidino —NHR, wherein R is H or alkyl; phenolic —OH; and —SH; and the second intermediate is a low molecular weight organic compound having at least two reactive groups each of which is capable of reacting with ethyl alcohol at room temperature to thereby yield a compound having two ester groups. Preferably, both reactants are dissolved in diluents and it is desirable that the solvent for one reactant be immiscible with the solvent for the other reactant. Preferably each intermediate is a liquid under the reaction conditions or is dissolved in a liquid diluent, but one of the intermediates may be a finely divided solid dispersed in a liquid diluent in which it is at least partially soluble. The liquid complementary reactant compositions may be combined over a wide range of temperature conditions, i.e., from about 0° C. to about 180° C. Generally it is convenient to employ room temperature. Polymers which may be formed in this manner include both linear and cross-linked polyamides, such as polyhexamethylene adipamide, polyhexamethylene sebacamide, polyethylene adipamide and the like, polysulfonamides, polyureas, polyurethanes, polythiolesters, and the like.

INTERFACIAL-FORMING COMPOSITIONS

It is preferred to employ water as diluent for one reactant in the process of the present invention, particularly for reactants such as diamines, dithiols or dihydroxy compounds, although aliphatic alcohols and glycols are also suitable for such reactants. Among liquids suitable for the complementary reactant may be mentioned benzene, toluene, xylene, cyclohexane, trichloroethylene, chlorobenzene, nitrobenzene heptane, ligroin, isooctane, ethyl ether, ethyl acetate, methyl amyl ketone, orthochlorobenzotrifluoride, ethylene dichloride, carbon tetrachloride, chloroform, thiophene and ethylene chlorobromide.

The preformed polymeric component may be dispersed in either or both of the immiscible phases containing complementary reactant. A homogeneous dispersion is provided when the particles are in the colloidal range of particle size less than about 15 microns, preferably 0.005 to 1.5 microns. Polymer particles of this size are obtained, if necessary, by mechanical means, such as by use of micronizers, homogenizers, ball mills, and similar pulverizers. The reduction in size of the polymer particles may be accomplished when the polymer is in the dry state or while it is in the form of a slurry, such as by the use of a three-roll paint mill.

The dispersions may be prepared in many ways. For example, they are prepared readily by mixing finely divided polymers with liquid in the amount desired. The liquid preferably contains an emulsifying agent when using this method. In some instances a dispersion can be formed from a solution of the polymer, by mixing the solution with a non-solvent medium. Under the proper conditions polymer dispersions are obtained, in which the particles are of appropriate size for use in the present process. Suspensions of appropriately fine polymers as obtained from emulsion polymerization processes may be employed directly, i.e., without intermediate isolation of the finely divided polymer. The presence of at least about 10% by weight of dispersed polymer in the solution of complementary reactant provides compositions from which a continuous structure of coalesced "preformed" polymer can be prepared. It is preferred to employ dispersions in the solution of complementary reactant containing from about 15 to about 40% dispersed polymer although higher concentrations may be used. The use of surface active agents to improve wetting and assist dispersion is advantageous, especially at the higher concentrations of dispersed material.

The complementary reactants present in the interfacial forming compositions may be conveniently designated as "hydrogen acceptors" and "hydrogen donors," respectively. Typical hydrogen acceptors include di- or polycarboxylic acid halides, phosphoric anhydrides of di- and polycarboxylic acids, di- and polyisocyanates, di- and polyisothiocyanates, phosgene, di- and polyazlactones, mixed anhydrides of di- and polycarboxylic acid with trifluoroacetic acid, di- and polychloroformate, di- and polysulfonic acid halides, disulfonyl, dilactams and polysulfonyl polylactams. Typical hydrogen-donors include di- and polyamines, thiourea, dithiobiuret, guanidine, aminothiazine, aminothiol, aminoalkylphenol, di- and polyhydric phenols, di- and polythiols and the like. Mixtures of either hydrogen-acceptors, hydrogen-donors or both may be employed to form copolymers.

The concentration of the complementary reactant in their respective solvents is not critical for the process of the invention. However, a concentration of 3–25% is preferred. At concentration beyond this range, the spinning becomes increasingly more difficult. Optimum results are obtained with solutions containing 5–20% complementary reactant. In addition to the preformed polymer, other particles such as fillers, pigments, dyes or other materials can be present in the dispersion.

PRODUCTS FORMED

The structure formed in the interfacial-forming process of the present invention may carry the preformed polymeric component as a core within its skin of condensation polymer, as a coating or both depending upon whether dispersion of the preformed polymer composition is employed as the extruded phase, the phase into which extrusion is accomplished or both phases. The structure emerging from the interfacial-forming operation preferably contains a major amount of dispersed preformed polymer held in shape by a minor amount of interfacially-formed polymer. Thus, following the forming operation the interfacially spun polymer serves as a matrix for the preformed polymer through the washing, drying, and coalescing steps of the shaping process. After sintering or coalescing of the preformed polymer, it becomes self-supporting and can usually, according to its nature, be drawn and subjected to various conventional treatments such as dyeing, shrinking, setting, and the like. The interfacially-formed polymer forms readily from its complementary coreactants upon extrusion of one coreactant solution into the solution of the complementary coreactant.

One advantage of the process of the present invention is the high speed with which the two-component fiber or film can be produced. The novel product permits the properties of two polymeric components to be blended. Thus, a very strong, extremely high molecular weight polyacrylonitrile (i.e., intractable, with mol. wt. of about 2,000,000) can be spun from a dispersion with the use of a polyamide matrix material to form a two-component fiber having better dyeability, better resistance to alkali, higher moisture absorption and an increased abrasion resistance than the corresponding polyacrylonitrile fiber. Alternatively, the polyamide component may be leached out. The process also provides a method for shaping polymers that cannot be handled by conventional melt, dry or wet spinning because of too high melt or solution viscosity, insolubility, decomposition at the polymer melt temperature and the like. It provides a polymer shaping process using comminuted polymer that requires neither high pressure nor elevated temperature. Furthermore where the preformed polymer has been produced by emulsion polymerization, the shaping operation can be accomplished without isolation and purification of the said preformed polymer.

Many obvious modifications will be apparent to those skilled in the art from a reading of the above without a departure from the inventive concept.

What is claimed is:

1. A composition of matter comprising an inert liquid solution of between about 3 and 25% of an organic compound having two reactive groups and being selected from the class consisting of dicarboxylic acid halides and diamines, said solution having dispersed therein a dispersion of at least about 10% by weight of a polymer selected from the group consisting of polytrifluorochloroethylene, polytetrafluoroethylene, polyvinylfluoride, and polyacrylonitrile, said polymer being in the form of particles of below about 15 microns.

2. The composition of claim 1 wherein the dispersed polymer is polytrifluorochloroethylene.

3. The composition of claim 1 wherein the dispersed polymer is polytetrafluoroethylene.

4. The composition of claim 1 wherein the dispersed polymer is high molecular weight solid polyvinylfluoride.

5. The composition of claim 1 wherein the dispersed polymer is polyacrylonitrile.

6. The composition of claim 1 wherein the organic compound is sebacyl chloride.

7. The composition of claim 1 wherein the organic compound is hexahydroterephthaloyl chloride.

8. The composition of claim 1 wherein the organic compound is an aliphatic diamine.

9. The composition of claim 1 wherein the organic compound is hexamethylenediamine.

10. A composition of matter comprising a dispersion of at least about 10% by weight of polytetrafluoroethylene in the form of particles of below about 15 microns in aqueous hexamethylene diamine having a concentration of between about 3 and 25%.

11. A composition of matter comprising a dispersion of at least about 10% by weight of polyacrylonitrile in the form of particles of below about 15 microns in aqueous hexamethylene diamine having a concentration of between about 3 and 25%.

12. A composition of matter comprising a dispersion of at least about 10% by weight of polyvinyl fluoride in the form of particles of below about 15 microns in a dimethyl formamide solution containing between about 3 and 25% of hexamethylene diamine.

13. A composition of matter comprising a dispersion of at least about 10% by weight of polyvinyl fluoride in the form of particles of below about 15 microns in a dimethyl formamide solution containing between about 3 and 25% of sebacyl chloride.

14. A composition of matter comprising a dispersion of at least about 10% by weight trifluorochloroethylene in the form of particles of below about 15 microns in a benzene solution containing between about 3 and 25% sebacyl chloride.

References Cited in the file of this patent

UNITED STATES PATENTS

| | | |
|---|---|---|
| 2,347,525 | Thinius | Apr. 25, 1944 |
| 2,413,498 | Hill | Dec. 31, 1946 |
| 2,644,802 | Lontz | July 7, 1953 |
| 2,681,324 | Hochberg | June 15, 1954 |
| 2,708,617 | Magat et al. | May 17, 1955 |
| 2,772,444 | Burrows et al. | Dec. 4, 1956 |
| 2,801,982 | Fuchs | Aug. 6, 1957 |
| 2,811,459 | Wittcoff et al. | Oct. 29, 1957 |
| 2,829,944 | Houtz et al. | Apr. 8, 1958 |
| 2,891,921 | Kumnick et al. | June 23, 1959 |